US 8,935,615 B2

(12) United States Patent
Grandemenge (10) Patent No.: US 8,935,615 B2
(45) Date of Patent: Jan. 13, 2015

(54) METHOD FOR SECURING AN INTERFACE BETWEEN A USER AND AN APPLICATION, CORRESPONDING SYSTEM, TERMINAL AND COMPUTER PROGRAM PRODUCT

(75) Inventor: Jérôme Grandemenge, Colombes (FR)

(73) Assignee: Compagnie Industrielle et Financiere d'Ingenierie "Ingenico", Neuily Sure Seine (FR)

( * ) Notice: Subject to any disclaimer, the term of this patent is extended or adjusted under 35 U.S.C. 154(b) by 1180 days.

(21) Appl. No.: 12/689,704

(22) Filed: Jan. 19, 2010

(65) Prior Publication Data

US 2010/0185953 A1 Jul. 22, 2010

(30) Foreign Application Priority Data

Jan. 19, 2009 (FR) .................................... 09 50286

(51) Int. Cl.
| | | |
|---|---|---|
| *G06F 3/00* | (2006.01) | |
| *G06F 21/83* | (2013.01) | |
| *G06Q 20/10* | (2012.01) | |
| *G06F 3/0481* | (2013.01) | |
| *G06F 21/31* | (2013.01) | |
| *G06F 21/82* | (2013.01) | |

(52) U.S. Cl.
CPC .............. *G06F 21/83* (2013.01); *G06F 3/0481* (2013.01); *G06F 21/31* (2013.01); *G06F 21/82* (2013.01); *G06Q 20/10* (2013.01)
USPC .......................................... 715/743; 715/741

(58) Field of Classification Search
CPC ......... G06F 21/31; G06F 21/82; G06F 21/83; G06F 3/0481; H04L 63/1441
USPC ................................................... 715/741, 743
See application file for complete search history.

(56) References Cited

U.S. PATENT DOCUMENTS

| | | | |
|---|---|---|---|
| 5,550,968 A * | 8/1996 | Miller et al. ................... 715/741 |
| 7,240,360 B1 | 7/2007 | Phan | |
| 7,802,298 B1 * | 9/2010 | Hong et al. ...................... 726/22 |
| 7,853,882 B2 * | 12/2010 | Cheng et al. ................... 715/741 |
| 8,079,087 B1 * | 12/2011 | Spies et al. ...................... 726/26 |
| 2004/0123157 A1 * | 6/2004 | Alagna et al. ................. 713/201 |
| 2004/0128552 A1 * | 7/2004 | Toomey ........................ 713/201 |
| 2004/0153660 A1 * | 8/2004 | Gaither et al. ................ 713/200 |
| 2005/0182924 A1 | 8/2005 | Sauve et al. | |
| 2006/0101128 A1 * | 5/2006 | Waterson ....................... 709/212 |
| 2006/0174119 A1 * | 8/2006 | Xu ................................. 713/170 |

(Continued)

OTHER PUBLICATIONS

French Search Report of Counterpart Application No. 09/50286 filed on Jan. 19, 2009.

*Primary Examiner* — Patrick Riegler
(74) *Attorney, Agent, or Firm* — David D. Brush; Westman, Champlin & Koehler, P.A.

(57) ABSTRACT

An interface securing method between a user and a non certified application running on an electronic device and providing at least one view to be rendered on a screen, and a view comprising or associated to at least one interface control component. The method implements, prior to rendering a view: analysis of the interface control components of the view, so as to detect at least one interface control component that could pose a security problem, called a suspicious component; and if at least one suspicious component is detected, restriction or invalidation of the functions of at least one input control component, distinct from the at least one suspicious component and able to allow the information to be provided by the user to the application.

13 Claims, 3 Drawing Sheets

(56) References Cited

U.S. PATENT DOCUMENTS

| | | | |
|---|---|---|---|
| 2007/0050710 A1* | 3/2007 | Redekop | 715/523 |
| 2007/0124601 A1* | 5/2007 | Singh et al. | 713/189 |
| 2007/0244761 A1 | 10/2007 | Scipioni et al. | |
| 2008/0155691 A1 | 6/2008 | Fossen et al. | |
| 2008/0320010 A1* | 12/2008 | Li et al. | 707/100 |
| 2009/0132419 A1* | 5/2009 | Grammer et al. | 705/50 |
| 2009/0158441 A1* | 6/2009 | Mohler et al. | 726/27 |

* cited by examiner

METHOD FOR SECURING AN INTERFACE BETWEEN A USER AND AN APPLICATION, CORRESPONDING SYSTEM, TERMINAL AND COMPUTER PROGRAM PRODUCT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the securing of an interface between users and computer applications for electronic devices, and more particularly secured electronic devices.

More precisely, the disclosure relates to the control or monitoring of the implementation of non-secured applications, for example non certified applications, on terminals which also implement certified applications.

The disclosure thus especially relates to payment terminals.

BACKGROUND OF THE DISCLOSURE

Due to the nature of the operations for which they are intended, such terminals which permit electronic payments, and more generally operations which require securing and which suppose for example that a secret code be communicated, are preferred targets for computer attacks.

In particular, a malicious computer application running on a payment terminal could damage the availability or operation of this terminal, or use the information provided by a user to carry out fraudulent operations.

Parts of code may for example be activated by the user him/herself, without realising it, when interacting with the terminal. A malicious application may especially obtain from the user sensitive data, such as bank data for example.

Phishing techniques are also used to incite the user to supply confidential data by usurping the identity of a respectable company. For example, the user may be directed without realising it to a malicious web site that presents itself as the site of the user's bank or for an online purchasing site.

According to another approach, the malicious application may play a film, requiring confidential information to be provided by simulating the usual interface of a secured application. The application "behind" the film may then collect the confidential information, and transmit to a fraudulent user.

Aware of the stakes, the players in the field have tried to equip their terminals to counter this type of attack.

One of the solutions retained consists of defining the requirements in terms of security of the payment terminals and applications for these terminals and of certifying the terminals and applications so as to respect these requirements.

In particular, the "PA DSS" (Payment Application Data Security Standard") standard may be mentioned, defined by the PCI banking organisation interest group, the security requirements demanded by the EPC (European Payment Council) or by the "CB" bank card group.

The EMVCo (Europay Mastercard Visa Corporation) organisation also provides EMV certifications for payment applications or terminals through approved laboratories.

The certification of an application may for example lead to the insertion of a marker in the code of the application or in one of its configuration files.

The terminal then checks for the presence of this marker when the application is launched.

The certification of an application has thus become one of the criteria demanded by banking organisations to integrate it into a payment system.

One disadvantage of these techniques of the prior art lies in the obligation, for industrials supplying computer applications intended for payment terminals, to have each version of their application certified by an auditor certified by a standardisation group.

Consequently, a publisher of applications has to have an application certified to different standards if this application is designed to be used in several payment systems.

Another disadvantage lies in the fact that this certification operation may be costly, in terms of time and resources, for applications which change often.

The prior art also has the disadvantage of imposing a certification on all of the applications used on a terminal, whereas this is only essential for applications which effectively require securing. Consequently, on a payment terminal, a payment application must be certified. On the other hand, this is not necessary for a games application, or an application broadcasting information or advertisements.

SUMMARY

In the rest of the document, the term "control component" will be used to describe an interface component of an application that may allow it to carry out input/output operations, wherein said operations may be carried out by means of various hardware means such as for example a mouse, a keyboard, a bar code wand, a screen or a loud speaker. The term "input control component" or "input component" applies more particularly to the control components which permit input operations to be carried out (keyboards and other means of entering information in particular) and the terms "output control component" for control components permitting output operations to be carried out (screens, loud speakers, . . . ).

These control components have a certain number of properties such as, for example a set of potential actions of a user, or in the case of a control component associated to a graphic interface, a position on the screen, a size, a colour, the association to an image and/or a text and its parameters.

When it is run, the application generates successive views which form its interface with the user.

An aspect of the disclosure relates to an interface securing method between a user and a non certified application running on an electronic device and providing at least one view to be displayed on a screen, a view comprising or associated to at least one interface control component, implementing, when said application is running, the following steps:

analysis of the interface control components of said view, so as to detect at least one interface control component that could pose a security problem by inciting said user to provide sensitive information, called a suspicious component;

if at least one suspicious component is detected, restriction or invalidation of the functions of at least one input control component of said electronic device, distinct from said at least one suspicious component and able to allow said information to be provided by said user to said non certified application;

generation of the rendering of said view and reproduction of said view.

Consequently, an embodiment of the disclosure permits the authorisation of the implementation of non certified applications, on a secured terminal. To achieve this, an embodiment of the disclosure thus incorporates a dynamic control of each non certified application, and where applicable implements a suitable action, such as the restriction or the prohibition of the use of a keyboard or any other means of entering information that could be confidential.

In certain specific modes of implementation, said analysis step takes into account a predetermined set of rules to restrict the use of at least one of said interface control components and/or at least one combination of at least two of said interface control components.

In one specific embodiment, said analysis step may consider as a suspicious component any virtual keyboard, or a virtual keyboard located in a specific area of the screen.

According to certain specific embodiments, said restriction or invalidation step adapts said restriction or invalidation in function of said rule(s) that are not respected. For example, in the specific case where a virtual keyboard displayed in a particular zone of the screen is considered to be a suspicious component, the restriction step may especially limit the possibilities of positioning the pointer of a mouse, so as to keep it outside of this zone of the screen.

According to different embodiments, the restriction or invalidation step may concern at least one element belonging to the group comprising:

the prohibition of a display, the restriction of a capture zone, the restriction of the use of at least one means of input control.

In one embodiment, said restriction or invalidation step may limit the possible actions of the user on certain input control components, and especially on components other than the suspicious component detected.

Consequently, in certain specific embodiments, said restriction or invalidation step comprises a sub-step to prevent the entry of information via a hard or virtual keyboard.

According to some embodiments, this may be a keyboard of said electronic device or a keyboard belonging to another appliance, for example a peripheral appliance of said device. Consequently, in the case where the electronic device is a payment terminal, this may be for example the keyboard of a "pin-pad" (peripheral device used to enter the secret code of the user to encode it).

Said step may thus lead to the systematic invalidation of the inputs from a hard or virtual keyboard.

In other embodiments, said restriction or invalidation step may for example render inactive any alpha-numerical character from a hard or virtual keyboard and only authorise movement arrows.

In other embodiments, said restriction or invalidation step comprises a sub-step to prevent the entering of information in at least one zone of a viewing screen, wherein said zone is identified in function of a display zone associated to at least one suspicious component.

Consequently, in one specific embodiment, said restriction or invalidation step may for example prohibit certain joint positions of a touch-sensitive capture zone and a non certified image, assimilated during the analysis step to a suspicious component, so as to form a security perimeter around said image.

Finally, other modes of implementing the method may provide that said restriction or invalidation step comprises a sub-step for the dynamic modification of the rendering of at least one of said interface control components of said view.

In certain embodiments, said rules restriction may for example comprise at least one rule to prohibit at least one combination, judged to be risky, of control components on a same view. In this case, the restriction or invalidation step may lead to a refusal to display at least one of these control components on said view, and where applicable to display in its place or in addition to it a warning message.

For example, said restriction or invalidation step may prohibit the joint display of a virtual keyboard type input control component and a non certified image type output control component; and said restriction or invalidation step may lead to the refusal to display said virtual keyboard type input control component.

In still other modes, said restriction rules may proscribe at least one combination of certain properties of said control components.

In one specific embodiment, adapted to a payment terminal, said restriction or invalidation step may for example lead to a refusal to display a virtual keyboard type input control component in the presence of a text type output control component containing for example the term "pin".

Consequently, the method according to an example provides a technique which permits possibilities of interfering with a non secured application to be limited.

Furthermore, one advantage, according to at least one embodiment, is however to preserve the possibilities of running a non certified application.

Indeed, thanks to the method of an example of disclosure, a non certified application could be run on an electronic device, such as a payment terminal for example, if it respects all of the restriction rules defined.

For example, the restriction or invalidation step may authorise non-risky actions such as the use of drop-down menus or the display of message windows, or the use of simple buttons.

According to at least one embodiment, said interface securing method may comprise a verification of a certification of at least one of said interface control components used by said application.

In certain embodiments, said verification of a certification of said control components may be common to several applications.

Indeed, if several applications use the same control components, the publisher simply needs to have all of these control components certified once.

For example, the certification of a virtual keyboard may include the verification of each key on the keyboard, wherein the selection of a key "N" must only lead to the entry of the character "N", as well as the verification of the absence of a selection zone other than the keys displayed.

Another advantage of the application is to offer the possibility to a publisher to modify the appearance of a set of applications, by having certified a new set of control components, associated for example to new style sheets or new animations.

In certain specific embodiments, said at least one rule to restrict use is memorised in the electronic device when it is installed. In other embodiments, this may involve rules updated during a local or remote maintenance operation.

According to the modes of implementing the method, the method may comprise a step of downloading at least one of said rules to restrict use, from a remote site.

In certain modes of implementing the method, the device may for example interrogate a remote server before running the application in order to obtain said at least one rule to restrict use.

In certain specific embodiments, said interface control components belong to the group comprising:
- buttons;
- windows;
- texts;
- images;
- tabs;
- entry zones;
- virtual keyboards;
- menus;
- frames;
- tables;
- touch-sensitive capture zones;
- lists of choices;
- boxes to be ticked;
- progress bars;
- sliding cursors;
- drop-down tree structures;
- elevators;
- datepickers and/or timepickers;
- loud speakers;
- hard keyboards;
- mice;
- cameras;
- bar code wands;
- biometric information scanners;
- combinations of these elementary controls.

In one specific embodiment, the interface securing method is adapted to an implementation in an Internet environment.

In one particularly advantageous embodiment, the method may be adapted for use in an environment which respects the recommendations of the W3C (World Wide Web Consortium).

In particular, in certain embodiments, said non certified application has a user interface written in a language that is compatible with the XML standard (eXtensible Markup Language).

In certain embodiments, the description of said view and its interface control components may be made, for example with XML, so as to define a representation in the memory using a tree structure of the control components. Consequently, it is then possible to apply an automatic algorithm.

In one advantageous embodiment, said view and/or its interface control components are shown in a memory using the Document Object Model technology.

In other embodiments where the user interface of the application is formed by a finite set of fixed views, which cannot be modified dynamically by the application, said description may be implemented so as to react to the actions made on the control components. Said description may then for example, be implemented using a SAX technology (Simple API for XML).

Finally, in certain modes of implementing the method, said restriction rules may be described with a language based on XML.

The disclosure further relates to a computer program product that may be downloaded from a communication network and/or saved onto a support which may be read by computer and/or executed by a processor, comprising program code instructions to implement said interface securing method.

In particular, said analysis and/or said restriction or invalidation step may be implemented in a language which permits the analysis of a rules file that is compatible with the XML standard, such as the languages C, C++ or Java for example.

The disclosure also relates to a terminal implementing the method described above and which includes interface means between a user and a non certified application running on said terminal and supplying at least one view to be displayed on a screen, wherein a view is comprised or associated to at least one interface control component.

Such a terminal implements, when said application is running:

means of analysing the interface control components of said view, so as to detect at least one interface control component that may pose a security problem by inciting said user to provide sensitive information, called a suspicious component;

if at least one suspicious component is detected, means to restrict or invalidate functions of at least one input control component of said electronic device, distinct from said at least one suspicious component and able to permit the supply of said information by said user to said non certified application;

means of generating the display of said view and the reproduction of said view.

In one embodiment of the disclosure, said terminal is equipped with a Graphical User Interface.

According to one embodiment, the terminal comprises electronic payment management means which cooperate with said screen.

BRIEF DESCRIPTION OF THE DRAWINGS

Other characteristics and advantages will become clearer upon reading the following description of an embodiment, provided simply by way of example and in no way restrictively, and the appended drawings among which.

DETAILED DESCRIPTION OF ILLUSTRATIVE EMBODIMENTS

1. General Principle

The general principle of an exemplary embodiment includes dynamically limiting the risks of harming a non certified application running on an electronic device by the dynamic application of predefined security rules on the interface control components of the application.

For example, an exemplary embodiment permits the authorisation to run a non certified application, such as a video animation, on an electronic device such as a payment terminal. The approach is not to allow such an application, as far as possible, the possibility of implementing malicious actions by dynamically analysing its input and/or output control components, when generating a view to be reproduced or rendered, especially on a screen.

One simple example consists of prohibiting a video application from using any input control interface components while the video sequence is playing. Another example consists of only authorising certified input control interface components, which are involved in the playing of the video sequence, such as "play", "pause", "stop" buttons. This second approach permits certain functions of the application to be authorised whilst protecting the user.

Consequently, it will not be possible to respond to a malicious invitation in the video to provide data, and for example to enter a secret code via a keyboard, as the keyboard will have been invalidated. Similarly, if the non certified application has a virtual keyboard to enter data (which supposes the presence, in the application, of an input control component on the virtual keyboard), an exemplary embodiment will provide for the invalidation of a pointer, for example a mouse, at least close to this virtual keyboard and/or the invalidation of the function of validation or use of a keyboard. However, there will be no interruption to the view displayed.

The disclosure thus proposes an original approach, according to which it is not the non certified application that is invalidated, but the use of certain input components. In other terms, the use of the input components is conditioned to the presence and/or characteristics other non certified interface components, without directly intervening on the latter.

2. Description of a Specific Embodiment

In the description below, an example of an embodiment for a payment terminal is considered.

Figure 1:
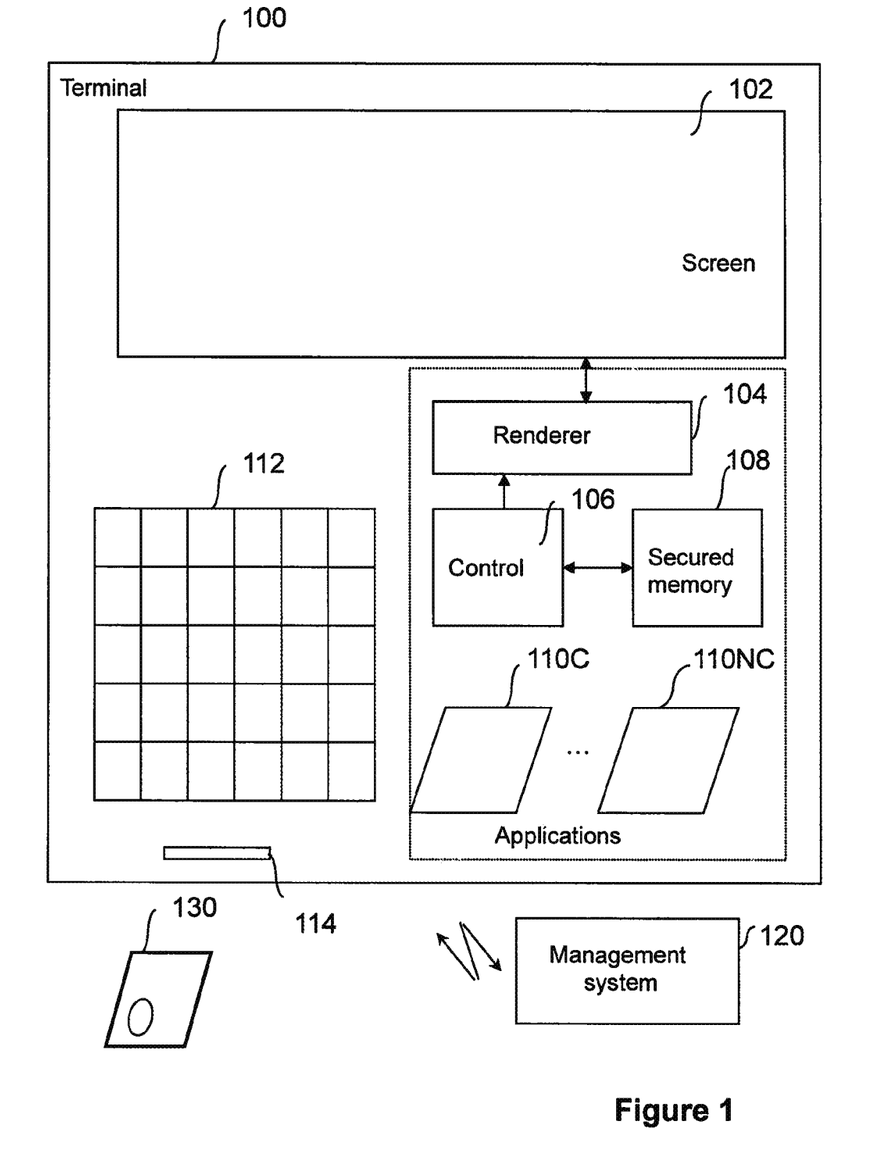
FIG. 1 shows a functional block diagram of one embodiment.

In relation to FIG. 1, a specific mode of implementation is presented, wherein said method is used in an Internet type technological environment.

In this specific embodiment, a payment terminal 100 permits a user to make payments and transmits information relative to these payments to a remote management system 120.

In the specific embodiment described here, the user uses to provide his/her personal data an electronic payment card 130 or a member card. However, other embodiments of the method may use other means of providing the personal data of the user. This may involve for example the providing of an access code to a specific Internet site containing personal data or an access code permitting an operation previously carried out by the operator to be identified, such as for example the purchase of a transport pass. This may also concern biometric information, read by a scanner provided for this purpose.

The terminal 100 comprises user interface means. In particular, in the specific embodiment described in FIG. 1, the terminal is equipped with a touch-sensitive screen 102. This involves for example a colour screen adapted to the viewing of video sequences.

In the example illustrated in FIG. 1, the terminal is also equipped with a hard keyboard 112 as well as a scanner 114 capable of reading the information contained in the electronic card 130.

The terminal comprises means of running at least two applications, for example at least one certified application 110C and at least one non certified application 110NC.

After verification of their certification, the applications 110C may be run as usual. On the other hand, a non certified application 110NC, for example a game or an advertising application, such as a video sequence, running on the terminal when it is not in use for example for a payment, must be controlled.

In the example shown, the user interface of the application 110NC is contained in interface description files written in a language that is compatible with the XML standard, such as a HTML or XUL language ("XML-based User interface Language").

The terminal 100 has a control module 106, that is able to extract rules contained in a secured memory 108 and to check they are respected by the views of the application 110NC.

Finally, a standard renderer 104, is consequently able to ensure the reproduction of the view on the screen 102.

According to one embodiment, the control module may comprise at least one parser, for example an XML parser, implemented in a language that is compatible with XML, such as C, C++ or Java. Said parser may be capable of generating a DOM tree ("Document Object Model") to describe the structure of the different views of the application and/or to control the validity dynamically, according to the security rules defined. In the example illustrated, the DOM tree is generated from XML interface description files when the application is launched then regenerated and/or modified when the application is run.

The control module is also able to modify the DOM tree in function of the restriction rules. This DOM tree may then be used by the renderer to display a view.

Other embodiments may be based on SAX technology.

Certain advantageous embodiments may be implemented in a web browser, such as a "WebC" browser for example, so that the dynamic modifications of the DOM permitted by a language such as for example the java script language may be systematically confronted with the security rules defined.

Figure 2:
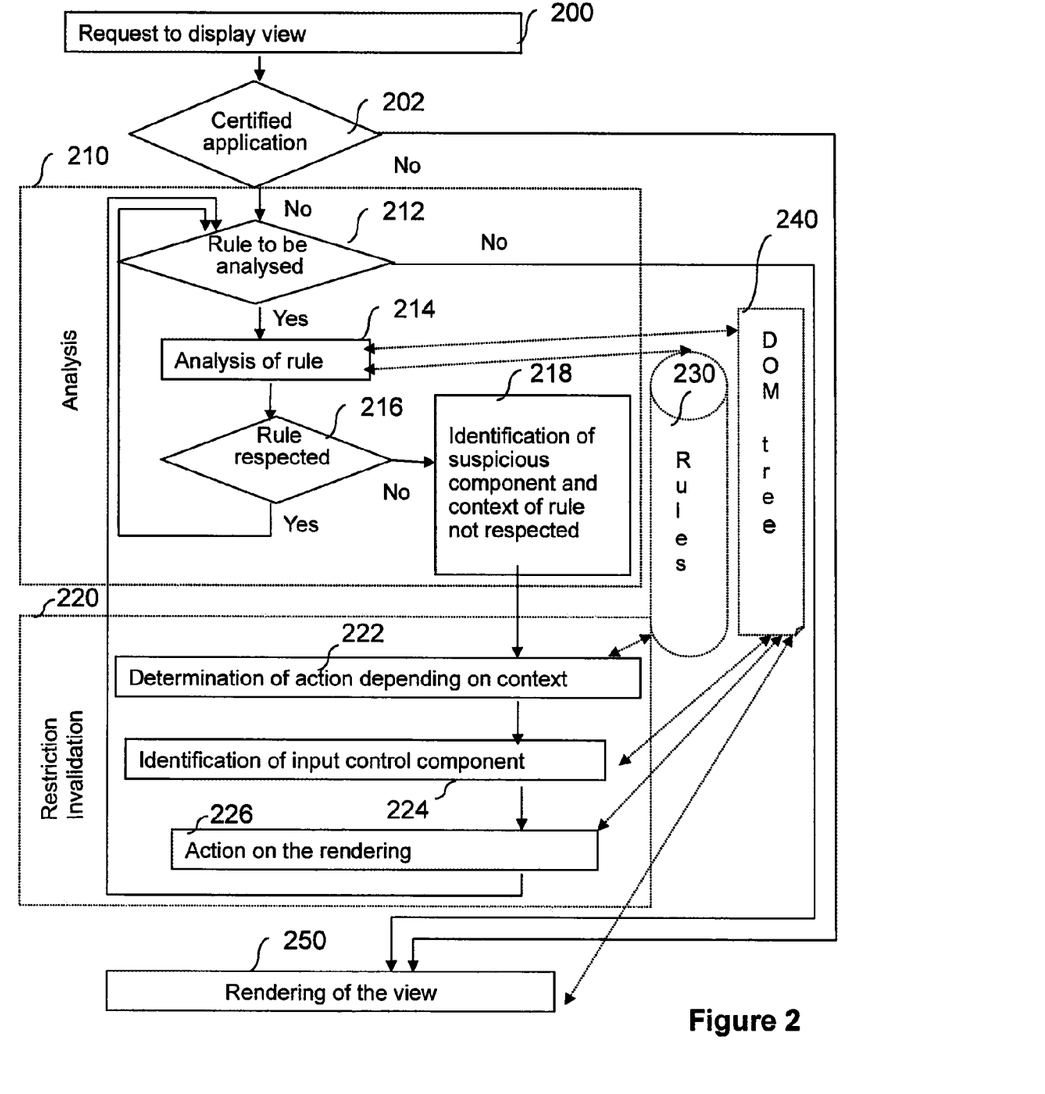
FIG. 2 illustrates the dynamic operation, based on the static block diagram of FIG. 1.

FIG. 2 illustrates the dynamic operation of an exemplary embodiment.

In the embodiment described here, the method is implemented when the application is run, when it requests the display of one of its views 200. A verification 202 of the certification of the application is carried out first. If the application is certified, no control is made on the view of the application before it is rendered.

In the case where the application is not certified, the method includes an analysis step 210, on the control components of said view.

According to one specific embodiment, this analysis is based on the respect of the rules for the restriction of use 230 stored for example in a memory zone 108 of the terminal.

These rules may for example be described in a language that is compatible with the XML standard.

In the embodiment presented in FIG. 2, the method provides for each rule the examination 212 of an analysis 214 of the respect of said rule by the DOM tree 240 corresponding to said view.

In certain implementations, said rules may include a demand for the certification of the interface control components present in the DOM tree.

The analysis step 210 may then include for example a verification of the certification for each interface control component present in the DOM tree.

In other embodiments, the method may include, as soon as the application is launched, and/or at predetermined instants, a step to verify the certification of the application and/or certain sets of control components of the application, for example graphic libraries of control components.

One advantage, at least in certain specific embodiments, is thus to allow the restriction of the need for the certification of an application for it to be run on a terminal, to the certification of its interface control components, wherein said application respects the restriction rules defined.

If a rule is not respected (test 216), the analysis step concludes the identification 218 of at least one suspicious component. The context of said rule that is not respected may also be saved for use in the following step 220 of restriction/invalidation.

In other embodiments, the identification 218 of at least one suspicious component may also include the association of a risk level for this suspicious component. This risk level may for example be a function of the certification or the nature of said suspicious component.

According to an exemplary embodiment, the method then includes a restriction or invalidation step 220 of an input component, distinct from the suspicious component identified.

This step 220 comprises a sub-step 222 to determine the action of restriction or invalidation to be taken in function of the suspicious component and the rule that has not been respected. This determination sub-step 222 may also be based on additional restriction rules to those used in the analysis step 210.

For example, an additional rule may be to interrupt the running of the application as soon as a suspicious component is detected.

If the action to be taken is not to interrupt the application, the method then includes a sub-step 224 to identify at least one input control component, distinct from the suspicious component identified, on which the action of restriction/or invalidation is made. This identification may for example be carried out in relation with the DOM tree 240 describing the view.

Finally, the method includes the implementation of an action 226 on the rendering of the view before the step to generate and reproduce 250 the rendering of the view.

Figure 3:
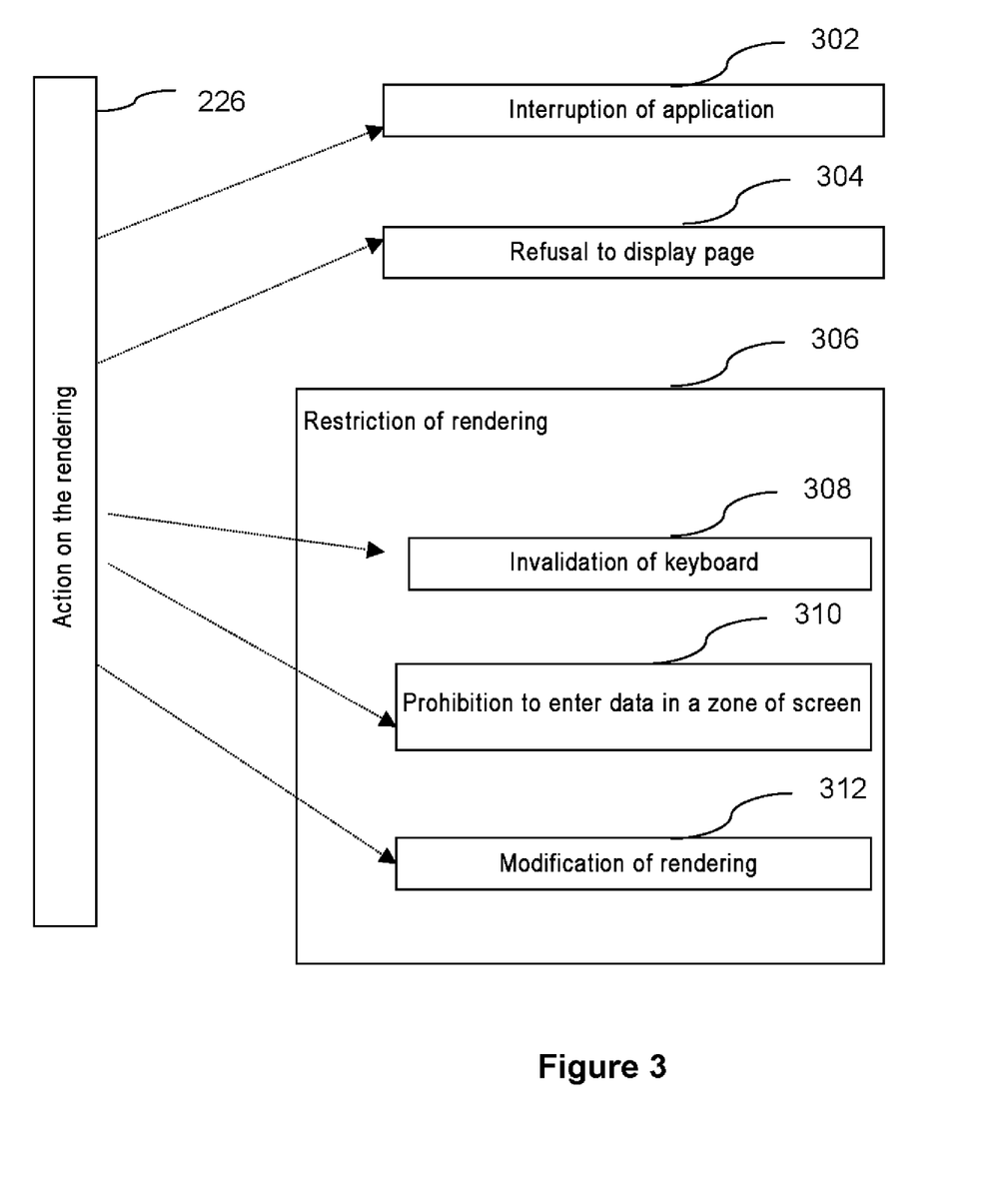
FIG. 3 illustrates possible actions on the display of the views of the application during the dynamic operation of the invention, as illustrated in FIG. 2.

This action on the rendering may vary according to the embodiments of the present disclosure, as illustrated in the example of FIG. 3.

One action may for example consist of interrupting the running of the application 302 or refusing to display the view 304.

According to various embodiments, restrictions may be made to the rendering of said view. For example, this may involve an invalidation 308 of a hard or virtual keyboard, prohibition 310 of any entry in at least one specific zone of the screen or a modification 312 of the rendering of said view of the application and especially of the input components identified in step 224.

Consequently, certain embodiments provide that at least one input control component, and possibly said suspicious components, may not be displayed.

In the specific embodiment described here, a simple restriction rule may consist in inhibiting all of the possible actions of a user on the screen 102 while a video sequence is playing.

An action on the rendering may then consist of deleting the display of all of the input control components included in the view.

Another rule may for example be to permit solely the use of certified interface control components related to the playing of said video sequence, such as "play", "pause", "stop" buttons for example.

In this case, an action on the rendering may consist for example in deleting the display of the various input control components of said buttons.

Another action may be to conserve their display but to render them inactive.

In one specific embodiment, a message explaining the detection of a risk may also be displayed.

In certain specific embodiments, for example when the analysis step 210 has associated risk levels to said suspicious components, the step 220 to restrict or invalidate an input component may vary according to the risk level of the suspicious component detected.

For example, the step 220 to restrict or invalidate may lead, in the case of a minor risk, to a refusal to display an input control component, wherein the application continues to run it, whereas in the case of the detection of a major risk, this step may lead to the interruption of the application.

In one variant of the implementation, the method comprises a prior step to determine the restriction rules 230. This step may for example comprise the determination of the restriction rules that are applicable by accessing a remote site of the manufacturer when the application is launched.

In one variant, the method may be applied to a certified application, in order to reinforce the security of the transactions made by the payment terminal.

At least one embodiment if the disclosure limits, for a publisher of applications, the constraints of the certification of its applications, especially when this concerns applications for which the security requirement for the application itself is low or nil.

At least one embodiment of the disclosure offers a cheap solution in terms of certification for the publishers of applications and thus adapted to the certification of applications which are frequently updated or to the certification of applications designed for several types of terminals and payment systems.

At least one embodiment proposes a solution that is easy to implement by publishers of applications.

One specific embodiment proposes a solution which can be adapted to suit the manufacturers of payment systems.

At least one embodiment provides a technique which permits the co-habitation, on a same terminal, of certified applications and non certified applications, without this being detrimental to the security of the certified applications.

At least one embodiment reduces the risks, for the user, of involuntarily transmitting confidential information to a non certified application.

Although the present disclosure has been described with reference to one or more examples, workers skilled in the art will recognize that changes may be made in form and detail without departing from the scope of the disclosure and/or the appended claims.

What is claimed is:

1. An interface securing method between a user and a non-certified application running on an electronic device and providing at least one view to be rendered on a screen, said view comprising or associated to at least two interface control components, wherein the method comprises, when said application is running, the following steps:

analysis by the electronic device of the interface control components of said view, so as to detect at least one suspicious component, being a first interface control component suspected to pose a security problem by inciting said user to provide sensitive information, wherein said analysis step takes into account a predetermined set of rules to restrict use of at least one of said at least two interface control components and/or at least one combination of at least two of said at least two interface control components and concludes to the identification of said suspicious component according to one non-respected rule of said predetermined set of rules;

if at least one suspicious component is detected:
determining an action of restriction or invalidation to be taken depending on said suspicious component and said non-respected rule;
identifying at least one second interface control component of said electronic device on which said action of restriction or invalidation is to be made, said second interface control component being distinct from said at least one suspicious component, and being an input interface control component able to allow said information to be provided by said user to said non-certified application, said second interface control component belonging to one zone of the viewing screen, wherein said zone is identified as a function of a display zone associated to said at least one suspicious component;

and restriction or invalidation of functions of said second interface control component, wherein said restriction or invalidation comprises prohibiting entry of information by means of said second interface control component;

and generation of a rendering of said view and reproduction of said view by the electronic device on said screen.

2. The interface securing method according to claim 1, wherein said restriction or invalidation step adapts said restriction or invalidation in function of said set of rules that are not respected.

3. The interface securing method according to claim 1, wherein said restriction or invalidation step comprises a substep to prohibit the entry of information via a hard or virtual keyboard.

4. The interface securing method according to claim 1, wherein said restriction or invalidation step comprises a substep to modify dynamically the rendering of at least one of said at least two interface control components of said view.

5. The interface securing method according to claim 1, wherein the method comprises a verification of a certification of at least one of said at least two interface control components used by said application.

6. The interface securing method according to claim 1, wherein the method comprises a step of downloading at least one of said set of rules for the restriction of use, from a remote site.

7. The interface securing method according to claim 1, wherein said interface control components belong to the group comprising:
  buttons;
  windows;
  texts;
  images;
  tabs;
  entry zones;
  virtual keyboards;
  menus;
  frames;
  tables;
  touch-sensitive capture zones;
  lists of choices;
  boxes to be ticked;
  progress bars;
  sliding cursors;
  drop-down tree structures;
  elevators;
  datepickers;
  timepickers;
  loud speakers;
  hard keyboards;
  mice;
  cameras;
  bar code wands;
  biometric information scanners; or
  combinations of these elementary controls.

8. The interface securing method according to claim 1, wherein the method is adapted to an implementation in an Internet environment.

9. The interface securing method according to claim 1, wherein said non-certified application has a user interface written in a language that is compatible with the XML standard.

10. The interface securing method according to claim 1, wherein said view and/or its interface control components are represented in a memory with aid of Document Object Model technology.

11. A non-transitory computer-readable support comprising a computer program product saved thereon and executable by a processor, wherein the product comprises program code instructions that, when executed by the processor, configure the processor to implement an interface securing method between a user and a non-certified application running on an electronic device and providing at least one view to be rendered on a screen, said view comprising or associated to at least two interface control components, wherein the method comprises, when said application is running, the following steps:

analysis of interface control components of said view, so as to detect at least one suspicious component, being a first interface control component suspected to pose a security problem by inciting said user to provide sensitive information, wherein said analysis takes into account a predetermined set of rules to restrict use of at least one of said interface control components and/or at least one combination of at least two of said at least two interface control components and concludes to the identification of said suspicious component according to one non-respected rule of said predetermined set of rules;

if at least one suspicious component is detected:
  determining an action of restriction or invalidation to be taken depending on said suspicious component and said non-respected rule;
  identifying at least one second interface control component of said electronic device on which said action of restriction or invalidation is to be made, said second interface control component being distinct from said at least one suspicious component, and being an input interface control component able to allow said information to be provided by said user to said non-certified application, said second interface control component belonging to one zone of the viewing screen, wherein said zone is identified as a function of a display zone associated to said at least one suspicious component;
  and restriction or invalidation of functions of said second interface control component, wherein said restriction or invalidation step comprises a sub-step of prohibiting entry of information by means of said second interface control component;
and generation of rendering of said view and reproduction of said view.

12. A terminal implementing an interface securing method and including interface means between a user and a non-certified application running on said terminal and providing at least one view to be rendered on a screen, said view comprising or associated to at least two interface control components, wherein the interface means implements, when said application is running:

means for analyzing the interface control components of said view, so as to detect at least one suspicious component, being a first interface control component suspected to pose a security problem by inciting said user to provide sensitive information, wherein said means for analyzing takes into account a predetermined set of rules to restrict use of at least one of said interface control component and/or at least one combination of at least two of said at least two interface control components and concludes to the identification of said suspicious component according to one non-respected rule of said predetermined set of rules;

means for determining an action of restriction or invalidation, if at least one suspicious component is detected, said action being taken depending on said suspicious component and said non-respected rule;

means for identifying at least one second interface control component of said electronic device on which said action of restriction or invalidation is to be made, said second interface control component being distinct from said at least one suspicious component, and being an input interface control component able to allow said information to be provided by said user to said non-certified application, said second interface control component belonging to one zone of the viewing screen, wherein said zone is identified as a function of a display zone associated to said at least one suspicious component; and means for restriction or invalidation of functions of said second interface control component wherein said restriction or invalidation step comprises a sub-step of prohibiting entry of information by means of said second interface control component;

and means for generating a rendering of said view and reproduction of said view.

13. The terminal according to claim 12, wherein the terminal comprises electronic payment management means which cooperate with said screen.

* * * * *